US005895130A

United States Patent [19]
Saito et al.

[11] Patent Number: 5,895,130
[45] Date of Patent: Apr. 20, 1999

[54] AUTO-FOCUS CAMERA

[75] Inventors: Tatsuo Saito; Shigenori Goto, both of Omiya, Japan

[73] Assignee: Fuji Photo Optical Co., Ltd., Omiya, Japan

[21] Appl. No.: 08/672,922

[22] Filed: Jun. 28, 1996

[30] Foreign Application Priority Data

Jun. 30, 1995 [JP] Japan ................................. 7-166505

[51] Int. Cl.⁶ ........................................... G03B 3/10
[52] U.S. Cl. ........................ 396/130; 396/131; 396/137
[58] Field of Search ................................. 396/103, 131, 396/137, 130

[56] References Cited

U.S. PATENT DOCUMENTS 4,300,823  11/1981  Yamanaka et al. ................. 396/137
4,470,680   9/1984  Inagaki ............................... 396/103
4,474,447  10/1984  Kawabata et al. .................. 396/130
4,750,013   6/1988  Yasukawa .......................... 396/130
4,933,701   6/1990  Matsuyama ........................ 396/137

*Primary Examiner*—Russell E. Adams
*Attorney, Agent, or Firm*—Sixbey, Friedman, Leedom & Ferguson; David S. Safran

[57] ABSTRACT

An auto-focus camera performs a focusing and a photometry when a shutter button is half depressed in an auto-focus mode. In this case, when an MF button is depressed, a result value of the focusing is held as long as the MF button is depressed even if the shutter button is released. When the shutter button is depressed again, only the photometry is performed. On the other hand, when the MF button is depressed in a manual focus mode, an object distance can be set by an UP/DOWN dial which is also used for setting various kinds of photographing items. The MF button is used for maintaining an AF lock, and is used for instructing the setting of the object distance in the manual-focus mode.

6 Claims, 6 Drawing Sheets

AUTO-FOCUS CAMERA

BACKGROUND OF THE INVENTION

1. Field of the Invention

The present invention relates to an auto-focus camera, and more particularly to an auto-focus camera which has a manual focus mode for a manual focusing and an auto-focus mode for an automatic focusing, and which has an AF lock function holding a focusing value for focusing by an auto-focus (AF) mechanism in the auto-focus mode and an AE lock function holding a photometry value for controlling an automatic exposure (AE) mechanism.

2. Description of the Related Art

The conventional camera is provided with an AF lock function and an AE lock function for preparing for the photographing when the shutter button is half depressed, and for performing the photographing when the shutter button is depressed completely. That is, when the shutter button is half depressed, a subject distance is measured by an auto-focus (AF) function, and a focusing is performed based on the result (a focusing value). A subject brightness is measured by an automatic exposure (AE) function, and a stop value and a shutter speed are set based on the result (a photometry value) (exposure setting). When the shutter button is depressed completely, the stop value and the shutter speed are controlled (exposure control), so that the shutter can be released. In the above-described camera, the focusing value and the photometry value when the shutter button is half depressed are held (AF lock and AE lock) while the shutter button is being half depressed. For example, if the photographing is performed in such a state that the focus point and the exposure are adjusted to a subject outside a focus area, the following processes are executed.

First, a photographing direction of the camera is directed to a subject, which is desired to be focused. Then the shutter button is half depressed, and the focus point is set to the subject. The camera is turned in a desired photographing direction while the shutter button is being half depressed, and then the shutter button is depressed completely. As a result, the photographing can be performed in such a state that the focus point and the exposure are set to the subject outside the focus area.

However, if the photographing is performed in such a state that the subject outside the focus area is focused as mentioned above, the exposure is adjusted to the subject outside the focus area. Therefore, there is a disadvantage in that the exposure is not correct if the subject brightness in photographing is different from the subject brightness in focusing.

Moreover, in the sequential photographing in the auto-focus mode, the focusing is performed every time the shutter button is half depressed. So, there is a disadvantage in that it takes much time until the shutter is released; therefore, the perfect moment for a good picture is missed. The subject distance hardly changes in the case of the sequential photographing. So, a camera, which can selectively fix a focus point once the focusing is performed, and control the exposure only so that the shutter speed can be faster, is desired.

Furthermore, as the functions of the camera increase, the set items of the photographing conditions increase. It is difficult to provide a switch, which sets the photographing conditions, in a limited space in a camera. Thus, it is hoped that one switch is used for setting the photographing conditions, so that the number of switches can be reduced.

SUMMARY OF THE INVENTION

The present invention has been developed in view of the above-described circumstances, and has its aim the provision of an auto-focus camera having an auto-focus mode and a manual focus mode, wherein one switch maintains an AF lock independently of the operation of a shutter button in the auto-focus mode and also allows a set means, which sets plural photographing conditions including an object distance, to function as an object distance set means in the manual focus mode, so that the number of switches can be reduced.

In order to achieve the above-described object, the present invention comprises: a focus mode selection means for selecting the auto-focus mode or the manual focus mode by switching; a set means for setting plural photographing conditions including an object distance; and is characterized in that when the auto-focus mode is selected by the focus mode selection means, the focusing is performed on the half depression of the shutter button, and the photographing is performed on the complete depression of the shutter button, and when the manual-focus mode is selected by the focus mode selection means, the photographing is performed in accordance with the object distance set by the set means; and further comprises a switch for holding the focusing result obtained by the half depression of the shutter button when the auto-focus mode is selected, and for allowing the set means to set the object distance when the manual focus mode is selected.

Moreover, in order to achieve the above-described object, in the present invention, the auto-focus camera comprises: a two-step shutter button for turning on the first switch when depressed half and for turning on the second switch when depressed completely; a focus mode selection means for selecting one of the auto-focus mode and the manual focus mode by switching; a focusing means for measuring a subject distance and transmitting a focusing value indicating a focusing value indicating the subject distance; a photometry means for measuring a subject brightness and transmitting a photometry value indicating the subject brightness; a control means for receiving the focusing value and the photometry value from the focusing means and the photometry means to prepare for photographing when the first switch is turned on, holding the received focusing value and the photometry value while the first switch is on, receiving the object distance set by the set means and receiving the photometry value from the photometry means when the first switch is turned on and preparing for photographing if the manual focus mode is selected by the focus mode selection means, holding the received photometry value while the first switch is on, and performing an exposure based on the held photometry value when the second switch is turned on; and is characterized in that a third switch is provided at a position where the third switch and the shutter button are operated simultaneously, and the third switch functions as a means for holding the focusing value while the third switch is on whether the first switch is on or off if the third switch is on while the focusing value and the photometry value are held, and also functions as a means for allowing the set means to set the object distance while the third switch is on in the manual focus mode.

According to the present invention, one switch has different functions according to the focus mode. That is, if the auto-focus mode is selected, the switch functions as a switch for holding the focusing result, which is obtained when the shutter button is half depressed. If the manual focus mode is selected, the switch functions as a switch for allowing a set means to set the object distance.

As a result, the AF lock can be maintained independently of the operation of the shutter button during the auto-focus mode. The switch for maintaining the AF lock makes it possible for a set means, which sets the photographing conditions including the object distance, to function as an object distance set means in the manual focus mode.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
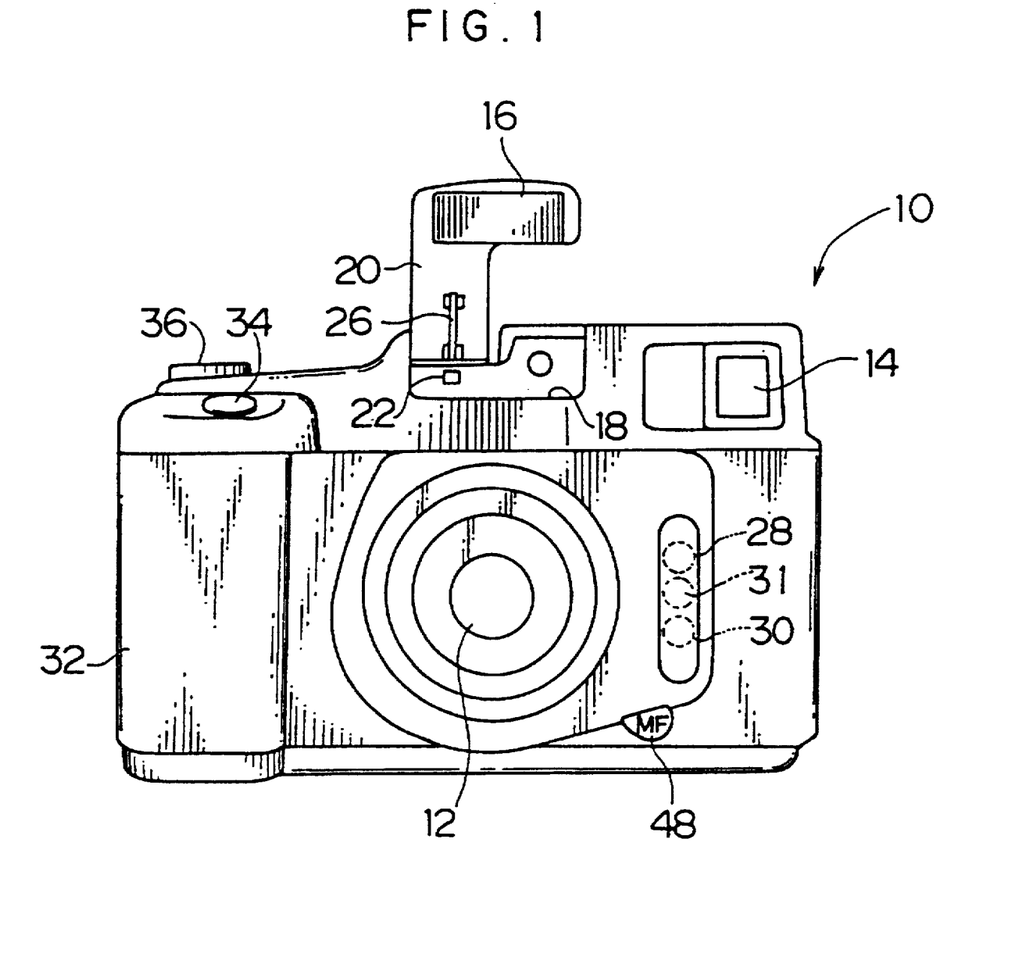
FIG. 1 is a front view of an auto-focus camera to which the present invention is applied.
Figure 2:
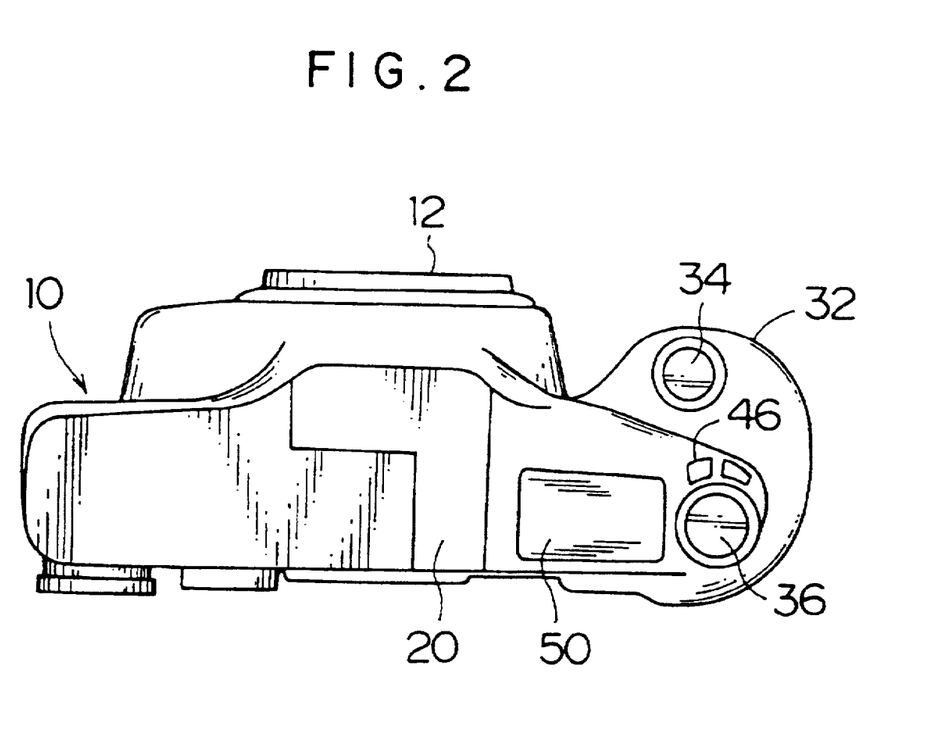
FIG. 2 is a top view of an auto-focus camera to which the present invention is applied.
Figure 3:
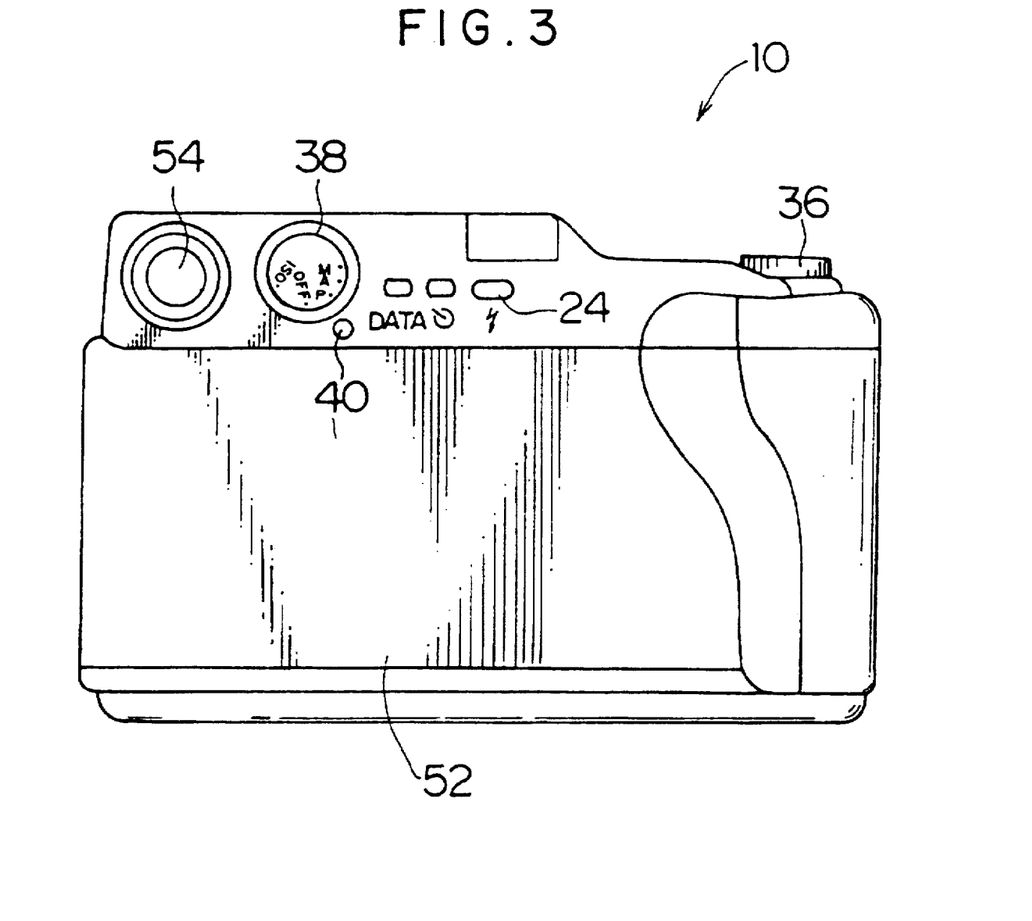
FIG. 3 is a rear view illustrating an auto-focus camera to which the present invention is applied.

FIGS. 1, 2 and 3 are a front view, a top view, and a rear elevation, respectively, illustrating an auto-focus camera to which the present invention is applied.

The camera in the drawing uses Brownie film. A taking lens 12 is arranged at a substantially central part on the front side of the camera's main body 10 as shown in FIG. 1. An illuminated finder 14 is arranged at the upper right corner with regard to the taking lens 12 in the drawing. A strobe flash part 16 is arranged above the taking lens 12, and is attached to a concave portion 18, which is formed on the top of the camera's main body 10. The strobe flash part 16 projects from and is stored from the concave portion 18. When the strobe flash part 16 is stored in the concave portion 18, an engagement groove (not shown), which is formed at an arm 20 in the strobe flash part 16, is engaged with a nail 22 positioned at the concave portion 18. As a result, the strobe flash part 16 can be held in a state of being stored in the concave portion 18. If a lock release button 24, which is provided at the back of the camera's main body in FIG. 3, is depressed, the engagement is released. As a result, the strobe flash part 16 projects from the concave portion 18 because the force is applied by a member (not shown), and then the strobe flash part 16 is held at a position as shown in FIG. 1. The rigidity of the arm 20 projecting from the concave portion 18 is improved by a link mechanism.

An AE light projector 28, an AF light acceptor 30, an AE light acceptor 31 are arranged close to each other on the right side of the taking lens 12 in the drawing. Further, a grip part 32 is formed on the left side of the camera's main body 10. A shutter button 34 is arranged at the top of the grip part 32.

As shown in FIGS. 1 and 2, an UP/DOWN dial 36 is arranged close to the shutter button 34. The UP/DOWN dial 36 is rotated for selecting a desired value in a mode selected by a select dial 38, which is provided at the back of the camera's main body 10 in FIG. 3. If a select dial lock button 40 is depressed to release the lock, the select dial 38 is rotatable so that one of the modes "M", "A", "P", "OFF", and "ISO" can be selected.

The mode "M" is a mode for the user to set an exposure manually. The user can freely select a stop value and a shutter speed. The mode "A" is a mode of a stop priority AE. If the user selects the stop value, the shutter speed is set automatically. The mode "P" is a mode of a program AE. The optimum stop value and shutter speed are set automatically by a subject brightness.

For example, if the mode "M" is selected by the select dial 38 and the UP/DOWN dial 36 is rotated, the stop value and the shutter speed can be selected. If the mode "A" is selected and the UP/DOWN dial 36 is rotated, the stop value can be selected.

If the mode "P" is selected by the select dial 38 and the UP/DOWN dial 36 is rotated in such a state that an exposure correction button is being depressed, an exposure value can be corrected. If the UP/DOWN dial 36 is rotated in such a state that a "DATA" button (see FIG. 3) is being depressed, the date can be changed. If an AF button 46 is depressed to change the mode to the MF mode and then the UP/DOWN dial 36 is rotated in such a state that an "MF" button 48 is being depressed, an object distance can be set.

If the mode "ISO" is selected by the select dial 38 and then the UP/DOWN dial is rotated, an ISO range can be selected. The values selected in the above-mentioned manner are displayed on an LCD panel 50, which is arranged close to the select dial 36. If the mode "OFF" is selected, a main power source of the camera is turned off. Incidentally, when operated manually and when a back cover of the camera in FIG. 3 opens, the UP/DOWN dial 36 feeds a leader part of the film by driving a film feed motor. The leader part can be wound around the windup reel. The number 54 indicates an eyepiece of the finder 14.

Figure 4:
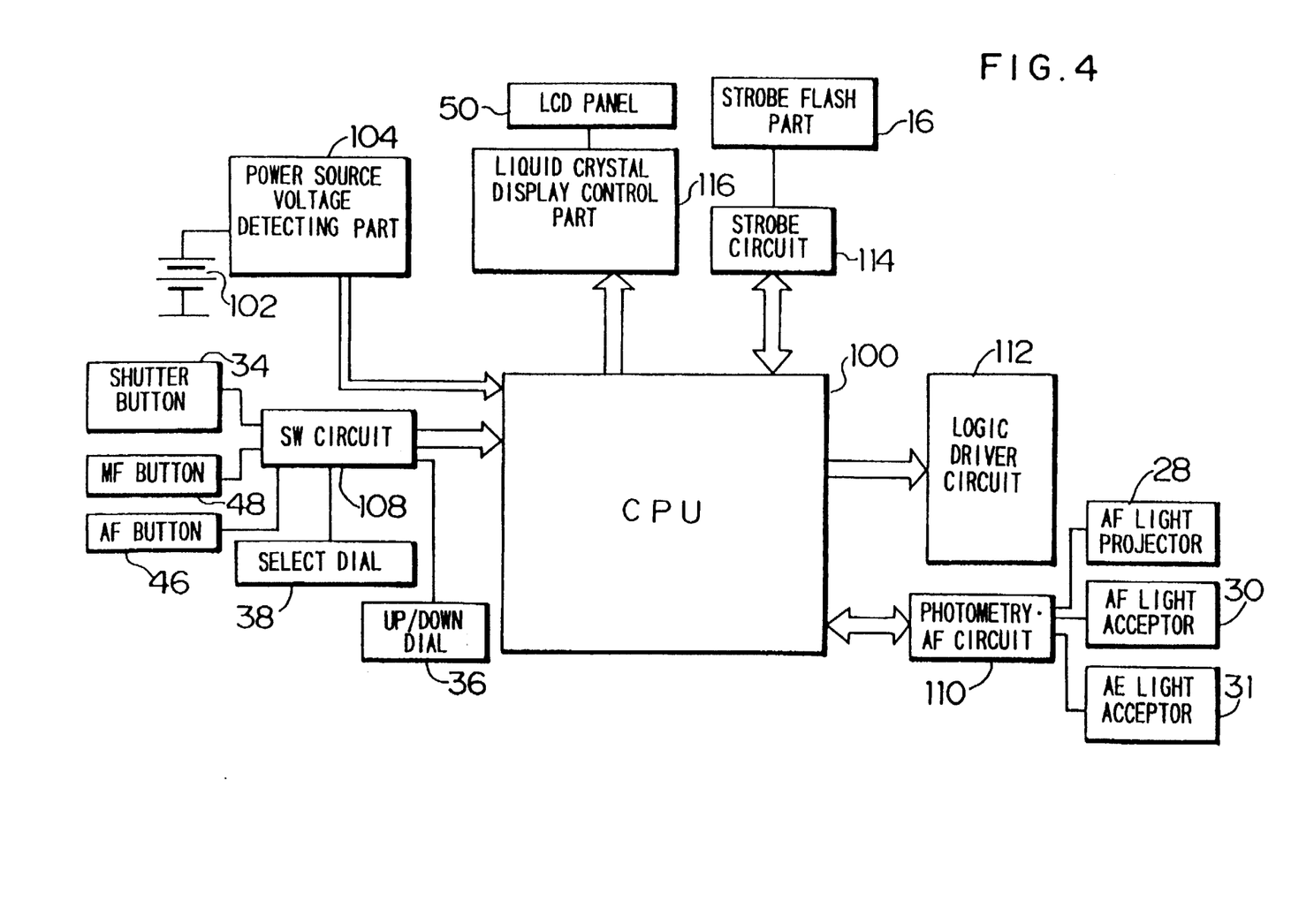
FIG. 4 is a block diagram of a control part in an auto-focus camera to which the present invention is applied.

FIG. 4 is a view illustrating one embodiment of a control part in the auto-focus camera.

As shown in the drawing, the control part of the camera is composed of a central processing unit (CPU) 100, an electric battery 102, a power source voltage detecting part 104, a switch circuit (a SW circuit) 108, a photometry·auto-focus (AF) circuit 110, a logic driver circuit 112, a strobe circuit 114, and a liquid crystal display control part 116.

The power source detecting part 104 detects the voltage of the electric battery 102, and converts the detected voltage value into a digital signal by an A/D converter (not shown) to output it to the CPU 100. Then, the CPU 100 checks the battery of the electric battery 102 based on the voltage value indicated by the digital signal.

If the shutter button 34 is depressed half, the battery checking is performed. When the shutter button 34 is half depressed, the CPU 100 detects the voltage of the electric battery 102, which is transmitted from the power source voltage detecting part 104. Then the CPU 100 transmits the detected voltage to the liquid crystal display control part 116, and displays the residual capacity of the electric battery 102 on the LCD panel 50.

If the capacity of the electric battery 102 is used to an extent which the photographing becomes impossible, a warning such as a battery shortage is displayed on the LCD panel 50, and the shutter release is prohibited.

The switch circuit 108 detects a state of each operation part provided in the camera, and transmits a signal indicating the state to the CPU 100. For example, the switch circuit 100 transmits a signal indicating the half and full depression of the shutter button 34, a signal indicating a mode selected by the select dial 38, a signal indicating an auto-focus mode or a manual focus mode selected by the AF button 46, a signal indicating whether the MF button 48 is depressed or not, a signal indicating a rotational speed when the UP/DOWN dial 36 is rotated, and the like. The CPU 100 executes each process based on these signals.

When the CPU 100 instructs the photometry/AF circuit 110 to perform the photometry, the photometry/AF circuit 110 detects the subject light from the AE light acceptor 30 and measures the subject brightness (photometry), and transmits the measurement result (photometry value) to the CPU 100. When instructed to perform a focusing, the photometry/AF circuit 110 receives the light from the AF light projector 28 at the AF light acceptor, and measures the subject distance in a triangulation method (focusing). Then, the photometry/AF circuit 110 transmits the measurement result (focusing value) to the CPU 100.

The CPU 100 detects a signal, which is transmitted from the switch circuit 108, and performs various kinds of operation processes based on the signal. The CPU also outputs a control signal to each control part. For example, if the auto-focus mode is selected by the AF button 46 and the shutter button 34 is half depressed, the CPU 100 instructs the photometry/AF circuit 110 to perform the photometry and the focusing, and reads the photometry value and the focusing value from the photometry/AF circuit 110. Then, the CPU 100 records the values in an internal memory (not shown), and sets a focus point position of the taking lens 12, the stop value and the shutter speed, and transmits them to the logic driver circuit 112.

Incidentally, if the mode "M" or "A" is selected by the select dial 38 and the stop value and the shutter speed are set by the UP/DOWN dial 36, these values are purposely used as set values.

If the manual focus mode is selected by the AF button 46, the focus point position of the taking lens 12 is set in accordance with the object distance set by the user rotating the UP/DOWN dial 36.

The logic driver circuit 112 controls the driving of the taking lens 12, the stop value and the shutter, based on the focus point position of the taking lens 12, the stop value and the shutter speed, which are transmitted from the CPU 100. As a result, the focus point and the exposure can be adjusted.

The strobe circuit 114 charges when the strobe photographing is performed. If the CPU 100 instructs the strobe circuit 114 to flash the strobe flash part 16 in a predetermined timing in response to the shutter release, the strobe circuit 114 flashes the strobe flash part 16.

Next, a detailed explanation will be given of an operation of the MF button 48.

In the auto-focus camera, which is constructed in the above-mentioned manner, if the auto-focus mode is selected by the AF button 46 and when the shutter button 34 is half depressed, the focusing and the photometry are performed. If the shutter button 34 is held in a state of being half depressed, the results (the focusing value and the photometry value) are retained. That is, the auto-focus camera has an AF lock function and an AE lock function.

The AF lock function and the AE lock function work simultaneously when the shutter button 34 is half depressed. The lock of them is also released simultaneously when the shutter button 34 is released. Therefore, the focusing and the photometry cannot be performed for two different subjects. In order to eliminate the above-mentioned problem, the shutter button 34 is half depressed and the MF button 48 is used so that the focusing and the photometry can be performed for different subjects.

An explanation will hereunder be given of an example in which the MF button 48 is used. In the photographing mode, if the focus point is adjusted to the subject outside the focus area and the exposure is adjusted to the photographing direction in photographing, the camera is turned to the subject, which is desired to be focused, and the shutter button 34 is depressed, so that the focusing and the photometry of the subject are performed. The focus point position of the taking lens 12 is set based on the focusing result (the focusing value), so that the subject is focused. Then, the results (the focusing value and the photometry value) are held in such a state that the shutter button 34 is being depressed.

In this case, the MF button 48 is depressed while the shutter button 34 is being half depressed (As a result, the focusing value is held even if the shutter button 34 is released). Next, the shutter button 34 is depressed half and depressed completely in succession, so that the shutter can be released. The last time the shutter button 34 is depressed, the MF button 48 is depressed. Therefore, only the photometry is performed while the focusing value is being held, and the stop value and the shutter speed are set based on the photometry value. The exposure is controlled based on the set values when the shutter button 34 is fully depressed.

As mentioned above, the focusing can be performed for an optional subject by means of the MF button 48, and the photometry can be performed for the subject in photographing.

Moreover, when the shutter button 34 is fully depressed, the shutter button is held in a state of being half depressed so that the focusing value can be held, and the photometry value is held. In this state, the photographing direction is changed, and the shutter can be released. That is, the focusing and the photometry can be performed for an optional subject regardless of the subject in photographing.

Furthermore, if the sequential photographing is carried out with the focus point being fixed, the MF button 48 is depressed in the above-mentioned procedure so that the focusing value can be held. In this state, the shutter button is sequentially depressed fully. As a result, the photographing intervals become short because the focusing is not executed, and the photographing can be carried out with the correct exposure because the photometry is executed in each photographing.

On the other hand, if the manual focus mode is selected by the AF button 46, the MF button 48 is used to instruct the setting of the object distance.

If the manual focus mode is selected by the AF button 46, the user manually sets the object distance by the UP/DOWN dial 36. The UP/DOWN dial 36 is used for setting various kinds of photographing conditions, and other purposes. For this reason, what is to be set is instructed by each switch provided in the camera, and then each photographing condition is set by use of the UP/DOWN dial 36.

When the object distance is set, the select dial 38 is set to the mode "M", "A", or "P", which is used in photographing, and then the MF button is depressed. Thus, the set value of the object distance is displayed on the LCD panel 50. The UP/DOWN dial 36 functions as a dial for setting the object distance. When the UP/DOWN dial 36 is rotated in the upward or downward direction, the set value of the object distance can be increased or decreased, and a desired object distance can be set.

Next, an explanation will be given of the MF button 48 which has different operations in the auto-focus mode and the manual focus mode with reference to the flow charts in FIGS. 5 and 6.

Figure 5:
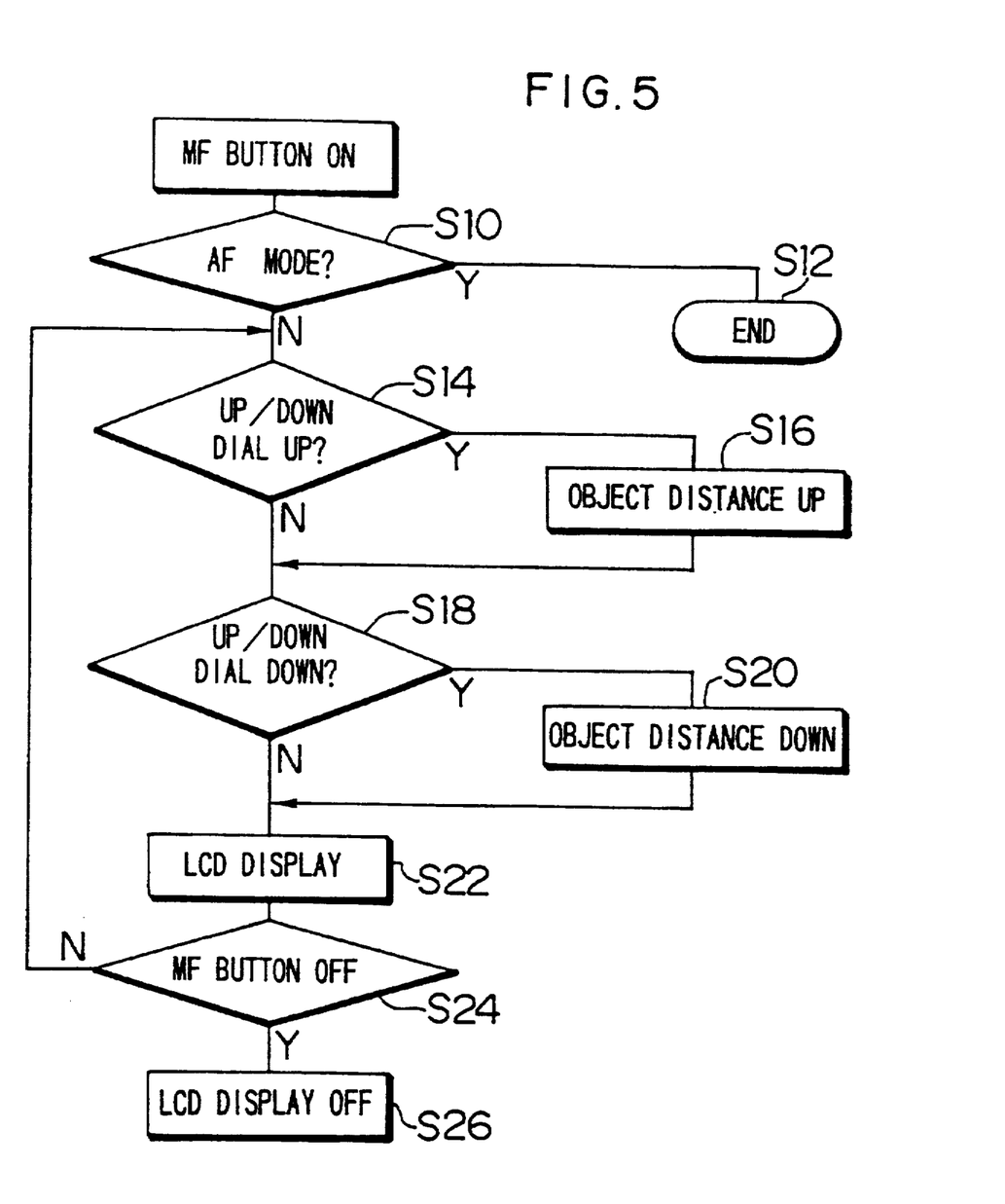
FIG. 5 is a flow chart of a control procedure of a CPU 100 when an MF button 48 is depressed.

The flow chart in FIG. 5 shows a procedure in controlling the CPU 100 in the case when the MF button 48 is depressed.

When the MF button 48 is depressed, the CPU 100 executes a process routine in FIG. 5 (Incidentally, if the shutter button is depressed half or fully, the other process routine is first executed. Particularly, in the auto-focus mode, the process routine in FIG. 6 is executed first.).

In the process routine of FIG. 5, it is first determined whether the mode is auto-focus mode or the manual focus mode (step S10). If the auto-focus mode, the control of the flow is stopped (step S12). Incidentally, in the case of the auto-focus mode, the process waits for the next operation (when the shutter button 34 is depressed, the flow chart in FIG. 6 is executed). If it is in the manual focus mode, it is judged whether the UP/DOWN dial 36 rotates in the upward direction or not (step S14). If the UP/DOWN dial 36 rotates in the upward direction, the object distance is increased by the rotational length. The focus point position of the taking lens 12 is set based on the object distance, and the set value is transmitted to the logic driver circuit 112. Then, the object distance of the taking lens 12 is set to the set value (step S16).

After the process in step S16 is completed, or if the UP/DOWN dial 36 does not rotate in the upward direction, it is judged whether the UP/DOWN dial 36 rotates in the downward direction (step S18). If the UP/DOWN dial 36 rotates in the downward direction, the object distance is decreased by the rotational length, and the object distance of the taking lens is set to the set value in the above-mentioned manner (step S20).

After the process in step S20 is completed, or if the UP/DOWN dial 36 does not rotate in the downward direction, the set object distance is displayed on the LCD panel 50 (step S22).

Next, it is judged whether the MF button 48 is released or not (step S24). If the MF button is being depressed, the process returns to step S14, and the above-described process is repeated. On the other hand, if the MF button 48 is released, the object distance displayed on the LCD panel 50 is deleted (step S26).

In the above-mentioned process routine, the MF button 48 can be used to instruct the setting of the object distance in the manual focus mode, so that the object distance can be set.

Next, an explanation will be given of an operation of the MF button 48 in the auto-focus mode.

Figure 6:
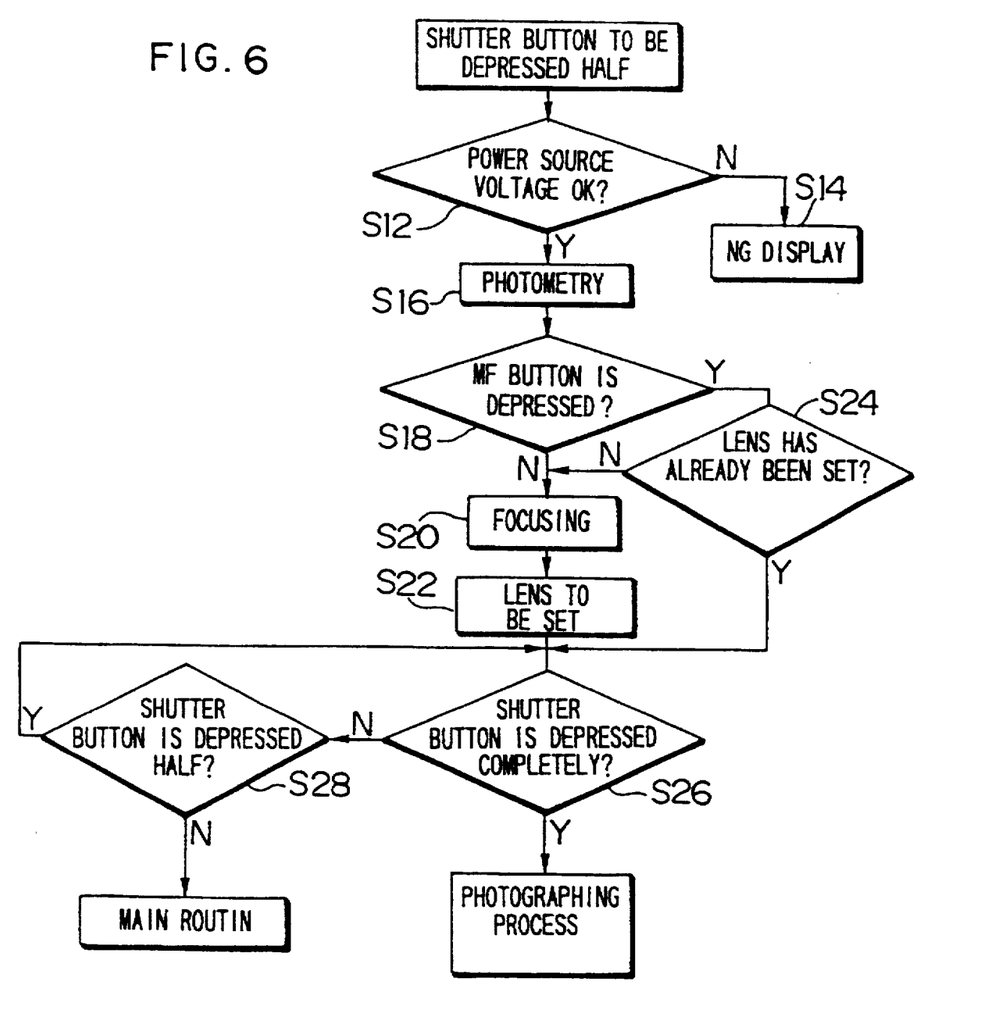
FIG. 6 is a flow chart of a control procedure of a CPU 100 when a shutter button is depressed in an auto-focus mode.

The flow chart in FIG. 6 shows a procedure in the control by the CPU 100 in the case that the shutter button is depressed half.

If the shutter button is depressed half in the auto-focus mode, the switch circuit 108 transmits a signal indicating the half depression of the shutter button 34 to the CPU 100, and the CPU 100 executes the process routine of FIG. 6. In the process routine, the voltage value of the electric battery 102 is read from the power source voltage detecting part 104, and the battery is checked (step S32). In this case, when the battery is insufficient, it is displayed on the LCD panel (step S34).

If the battery is OK, the photometry is performed (step S36). That is, the CPU 100 instructs the photometry•AF circuit 110 to perform the photometry, and reads the photometry value from the photometry•AF circuit 110. Then, the CPU records the photometry value in the internal memory. Incidentally, because the user sets the exposure if the select dial 38 is set to the mode "M", the photometry is not performed.

Next, it is judged whether the MF button 48 is depressed or not (step S38). That is, it is judged whether or not the switch circuit 108 transmits a signal indicating that the MF button 48 is depressed. If the MF button 48 is not depressed, the CPU outputs the focusing instruction to the photometry/AF circuit 110, and the subject distance is focused by the photometry/AF circuit 110 (step S40). Then, the CPU sets the focus point position of the taking lens 12 in accordance with the focusing value, and outputs the set value to the logic driver circuit 12 so as to adjust the focus point (step S42).

On the other hand, if the MF button 48 is depressed, it is determined whether the focus point of the taking lens 12 has already been adjusted or not (step S44). That is, it is determined whether the CPU records the focusing value in the internal memory or not. (For example, if the shutter button 34 is half depressed after the MF button 48 is depressed, the focusing has not been performed yet, so the focusing value is not recorded in the internal memory.)

If the focus point of the taking lens 12 has not been adjusted yet, the process goes on to step S20, and the focusing is performed in the above-mentioned manner (step S40). Then the focus point of the taking lens 12 is adjusted (step S42).

If the focus point of the taking lens 12 has already been adjusted in step S44, the process goes on to step S46.

In step S46, it is determined whether the shutter button 34 is depressed fully or not (step S46). That is, it is determined whether or not the switch circuit 108 transmits a signal indicating the full depression of the shutter button 34. If the shutter button 34 is not fully depressed, it is judged whether the shutter button 34 is half depressed or not (step S48). If the shutter button 34 is half depressed, the process returns to step S46.

That is, in the judgement in steps S46 and S48, the state of the shutter button 34 is detected. If the shutter button 34 is fully depressed, the exposure is controlled based on the photometry value recorded in the internal memory, so that the shutter is released. If the half depression of the shutter button 34 is released, the process returns to a main routine.

Incidentally, the main routine is a routine for detecting the switch signal from the switch circuit 108. If the switch circuit 108 outputs some switch signal, the process routine corresponding to the switch signal is performed.

In the above-described process routine, the MF button 48 is used as a switch for maintaining the AF lock in the auto-focus mode, so that the focusing value can be retained. When the shutter button is half depressed, only the photometry can be performed.

As has been described above, according to the auto-focus camera of the present invention, the AF lock can be maintained independently of the operation of the shutter button. Moreover, the same switch makes it possible for the setting means, which sets the photographing conditions including the object distance, to set the object distance in the manual focus mode. As a result, there is no need for a special switch which sets the object distance, and the number of switches can be reduced.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:
1. An auto-focus camera, comprising:
   a shutter button;
   focus mode selection means for selecting one of an auto-focus mode and a manual focus mode by switching;

photographing condition setting means for setting plural photographing conditions including an object distance;

object distance setting instruction means for instructing setting of the object distance; and control means having an autofocus mode for performing focusing and photographing condition setting upon a first-step depression of the shutter button, holding the obtained focusing result as long as the object distance setting instruction means is operated, including upon releasing of said first-step depression of the shutter button for enabling re-setting of a photographing condition without changing of the focusing result upon repeating of the first step depression of the shutter button, and performing photographing upon a second-step depression of the shutter button, when said auto-focus mode is set by said focus mode selection means, and said control means also having a manual focus mode for allowing the photographing condition setting means to set the object distance when the object distance setting instruction means is operated and for allowing the photographing condition setting means to set a different photographing condition when the object distance setting means is not operated, and performing photographing in accordance with the object distance set by the photographing condition setting means, when said manual focus mode is set by said focus mode selection means.

2. The camera according to claim 1, wherein the object distance setting instruction means is a push-button switch provided on the camera at a position where the push-button switch and the shutter button are operated simultaneously.

3. An autofocus camera according to claim 1, wherein the shutter button, the focus mode selection means, the photographing condition setting means, and the object distance setting instruction means comprise separate user operable, external selector elements on a body portion of the camera.

4. An autofocus camera according to claim 1, wherein the shutter button, the focus mode selection means, the photographing condition setting means, and the third switch comprise separate user operable, external selector elements on a body portion of the camera.

5. An auto-focus camera, comprising:

a two-step shutter button for turning on a first switch when depressed halfway and for turning on a second switch when depressed completely;

focus mode selection means for selecting one of an auto-focus mode and a manual focus mode by switching;

focusing means for measuring an object distance to transmit a focusing value indicating the object distance;

photometry means for measuring a subject brightness to transmit a photometry value indicating the subject brightness;

photographing condition setting means for setting plural photographing conditions including the object distance;

a third switch for instructing setting of the object distance; and control means for, in the auto-focus mode, receiving the focusing value and the photometry value from the focusing means and the photometry means to prepare for photographing when the first switch is turned on, holding the received focusing value and photometry value while the first switch is on, and holding the focusing value and releasing the photometry value when the first switch is turned off while the third switch is on for receiving a new photometry value when said first switch is turned back on, and for, in the manual-focus mode, allowing the photographing condition setting means to set the object distance while the third switch is on, receiving the object distance set by the photographing condition setting means, receiving the photometry value from the photometry means to prepare for photographing when the first switch is turned on, and holding the received photometry value while the first switch is on; the control means performing an exposure in accordance with the held photometry value when the second switch is turned on.

6. The camera according to claim 5, wherein the third switch is a push-button switch provided on the camera at a position where the push-button switch and the shutter button are operated simultaneously.

* * * * *